(12) United States Patent
Brand

(10) Patent No.: US 10,783,121 B2
(45) Date of Patent: Sep. 22, 2020

(54) TECHNIQUES FOR OPTIMIZING DATA FLOWS IN HYBRID CLOUD STORAGE SYSTEMS

(71) Applicant: CTERA Networks, Ltd., Petach-Tikva (IL)

(72) Inventor: Aron Brand, Petach-Tikva (IL)

(73) Assignee: CTERA NETWORKS, LTD., Petach-Tikva (IL)

( * ) Notice: Subject to any disclaimer, the term of this patent is extended or adjusted under 35 U.S.C. 154(b) by 773 days.

(21) Appl. No.: 14/674,245

(22) Filed: Mar. 31, 2015

(65) Prior Publication Data

US 2015/0205819 A1 Jul. 23, 2015

Related U.S. Application Data

(63) Continuation-in-part of application No. 12/641,559, filed on Dec. 18, 2009, now Pat. No. 9,614,924.

(60) Provisional application No. 61/974,402, filed on Apr. 2, 2014, provisional application No. 62/030,296, filed on Jul. 29, 2014, provisional application No. 61/140,071, filed on Dec. 22, 2008.

(51) Int. Cl.
*H04L 29/08* (2006.01)
*G06F 16/182* (2019.01)
*G06F 16/11* (2019.01)
*H04L 29/06* (2006.01)
*G06F 16/178* (2019.01)

(52) U.S. Cl.
CPC .......... *G06F 16/182* (2019.01); *G06F 16/125* (2019.01); *G06F 16/178* (2019.01); *H04L 65/607* (2013.01); *H04L 67/1002* (2013.01); *H04L 67/1097* (2013.01); *H04L 67/2842* (2013.01); *H04L 69/24* (2013.01)

(58) Field of Classification Search
CPC ........ G06F 17/30194; G06F 17/30085; G06F 17/30174; H04L 67/1002; H04L 67/1097; H04L 67/2842
USPC .......................................................... 709/218
See application file for complete search history.

(56) References Cited

U.S. PATENT DOCUMENTS

| | | | |
|---|---|---|---|
| 5,606,688 A * | 2/1997 | McNutt | G06F 12/0866 711/113 |
| 6,470,329 B1 * | 10/2002 | Livschitz | G06F 17/30949 |
| 7,113,963 B1 | 9/2006 | McCaw | |
| 7,203,796 B1 | 4/2007 | Muppalaneni et al. | |
| 7,325,145 B1 * | 1/2008 | England | G06F 21/10 380/201 |
| 7,430,639 B1 | 9/2008 | Bali et al. | |

(Continued)

*Primary Examiner* — Viet D Vu
(74) *Attorney, Agent, or Firm* — M&B IP Analysts, LLC

(57) ABSTRACT

A method and system for an optimized transfer of data files to a cloud storage service (CSS) are presented. The method comprises dividing a data file into a plurality of data blocks; assigning a block code to each of the plurality of data blocks; generating, based on a contract with the CSS, a first list of block codes from the plurality of data blocks, wherein the contract defines at least data blocks guaranteed to exist in the CSS; querying the CSS with the first list of block codes; responsive of the query, receiving a second list of block codes from the CSS, wherein the second list of block codes includes block codes of data blocks designated in the first list of block codes but missing in the CSS; and transmitting to the CSS data blocks designated by their block codes in the second list.

16 Claims, 6 Drawing Sheets

(56) References Cited

U.S. PATENT DOCUMENTS

| | | | |
|---|---|---|---|
| 7,596,620 B1 | 9/2009 | Colton et al. | |
| 7,752,180 B1 | 7/2010 | Fair et al. | |
| 7,865,663 B1 | 1/2011 | Nelson et al. | |
| 8,127,358 B1 | 2/2012 | Lee | |
| 8,135,683 B2 | 3/2012 | Douglis et al. | |
| 8,595,847 B2 | 11/2013 | Petta et al. | |
| 2002/0012397 A1* | 1/2002 | De With | H04N 19/60 375/240.18 |
| 2002/0095598 A1 | 7/2002 | Camble et al. | |
| 2003/0074574 A1 | 4/2003 | Hursey et al. | |
| 2004/0039889 A1 | 2/2004 | Elder et al. | |
| 2004/0054891 A1 | 3/2004 | Hengeveld et al. | |
| 2004/0098539 A1 | 5/2004 | Frank | |
| 2004/0143713 A1* | 7/2004 | Niles | G06F 11/1453 711/162 |
| 2005/0071586 A1 | 3/2005 | Bartfai et al. | |
| 2005/0086241 A1* | 4/2005 | Ram | G06F 17/30088 |
| 2005/0097225 A1 | 5/2005 | Glatt et al. | |
| 2006/0010154 A1 | 1/2006 | Prahlad et al. | |
| 2006/0080574 A1* | 4/2006 | Saito | G06F 11/1076 714/11 |
| 2006/0230076 A1 | 10/2006 | Gounares et al. | |
| 2006/0230245 A1 | 10/2006 | Gounares et al. | |
| 2006/0239275 A1 | 10/2006 | Zlateff et al. | |
| 2007/0143589 A1 | 6/2007 | Rawe et al. | |
| 2007/0162510 A1 | 7/2007 | Lenzmeier et al. | |
| 2007/0250593 A1 | 10/2007 | Sikdar et al. | |
| 2008/0005168 A1 | 1/2008 | Huff et al. | |
| 2008/0040420 A1* | 2/2008 | Twiss | G06F 17/30902 709/203 |
| 2008/0080552 A1 | 4/2008 | Gates et al. | |
| 2008/0288301 A1 | 11/2008 | Emling et al. | |
| 2008/0289006 A1* | 11/2008 | Hock | H04L 63/08 726/4 |
| 2008/0317068 A1* | 12/2008 | Sagar | G06F 17/30174 370/503 |
| 2009/0006792 A1 | 1/2009 | Federwisch et al. | |
| 2009/0006869 A1 | 1/2009 | Satya | |
| 2009/0007234 A1 | 1/2009 | Birger et al. | |
| 2009/0031212 A1 | 1/2009 | Hsu | |
| 2009/0070533 A1* | 3/2009 | Elazary | G06F 12/12 711/133 |
| 2009/0144422 A1 | 6/2009 | Chatley et al. | |
| 2009/0248693 A1* | 10/2009 | Sagar | G06F 17/30 |
| 2009/0288169 A1 | 11/2009 | Petta et al. | |
| 2009/0300169 A1 | 12/2009 | Sagar et al. | |
| 2009/0300672 A1* | 12/2009 | Van Gulik | H04L 29/06027 725/31 |
| 2010/0042720 A1 | 2/2010 | Stienhans et al. | |
| 2010/0088150 A1 | 4/2010 | Mazhar et al. | |
| 2010/0149096 A1 | 6/2010 | Migos et al. | |
| 2010/0274982 A1 | 10/2010 | Mehr et al. | |
| 2010/0318632 A1 | 12/2010 | Yoo et al. | |
| 2010/0332401 A1 | 12/2010 | Prahlad et al. | |
| 2010/0332588 A1 | 12/2010 | Schwimer | |
| 2013/0204849 A1 | 8/2013 | Chacko | |
| 2014/0082131 A1 | 3/2014 | Jagtap | |
| 2014/0082156 A1 | 3/2014 | Jagtap | |

* cited by examiner

TECHNIQUES FOR OPTIMIZING DATA FLOWS IN HYBRID CLOUD STORAGE SYSTEMS

CROSS-REFERENCE TO RELATED APPLICATIONS

This application claims the benefit of U.S. Provisional Application No. 61/974,402 filed on Apr. 2, 2014 and U.S. Provisional Application No. 62/030,296 filed on Jul. 29, 2014. This application is a continuation-in-part of U.S. patent application Ser. No. 12/641,559 filed on Dec. 18, 2009, now pending, which claims the benefit of U.S. Provisional Application No. 61/140,071 filed on Dec. 22, 2008. All of the applications referenced above are herein incorporated by reference.

TECHNICAL FIELD

The disclosure relates generally to hybrid cloud-storage networks, and more particularly to techniques for accelerating and retrieving the data of such networks.

BACKGROUND

The demand for storage has been rapidly increasing. As the amount of data such as digital media stored by users grows, so does the need for users to store digital media reliably over extended periods of time. Traditional backup solutions periodically copy data to, for example, backup tapes, compact discs (CDs), or other local storage media. However, such solutions are not optimal because the backup media is stored in a single location and media used for backing up are prone to failure.

Other solutions include storing data files on a local hard-drive of a personal computer (PC) and synchronizing the data remotely using hosted storage services. Having a remote backup ensures that data is stored in multiple locations, and is therefore protected against local disasters such as fires or floods. However, such solutions require installation of special client software on each individual PC in which the data will be stored. Such installation is prone to software incompatibilities, lack of central control, and high deployment costs.

Commercially available services referred to as cloud storage services provide mass storage through web services interface available over the Internet. FIG. 1 illustrates a storage system 100 designed to provide cloud storage services. The system 100 includes a distributed array of geographically distributed data centers 110-1 to 110-M (hereinafter referred to individually as a data center 110 and collectively as data centers 110) connected to a plurality of clients 120-1 to 120-N (hereinafter referred to individually as a client 120 and collectively as clients 120) through a wide area network (WAN) 130.

A data center 110 typically includes servers and mass storage facilitating cloud storage services to the clients 120. Such services enable applications including, for example, backup and restore of data, data migration, data sharing, data collaboration, and so on. Cloud storage services are accessible from anywhere in the world. To this end, each client 120 implements a web services interface designed to at least synchronize data with the data centers 110. Applications enabled by the cloud storage services are not aware of the specifics of the services and the underlying data synchronization operations. The disadvantage of commercially available cloud storage services is that such services do not implement standard file sharing protocols (e.g., common internet file system (CIFS) or network file system (NFS)). Furthermore, accessing files stored in cloud storage is typically slower than accessing files stored in local storage devices.

A network-attached storage (NAS) device is a self-contained appliance connected to a network with a primary purpose of supplying file-based data storage services to clients on the network. Specifically, a NAS device provides the functionality of data storage, file-based operations (e.g., read, write, delete, modify, and so on), and the management of these functionalities. However, commercially available NAS devices do not operate in conjunction with cloud storage services. Therefore, organizations and businesses utilizing NAS devices to store and manage their data cannot benefit from mass storage and applications of cloud storage services.

It would therefore be advantageous to provide a solution for integrating NAS devices with cloud storage services. It would be further advantageous to provide a solution that would optimize and accelerate the storage and retrieval of data from cloud storage services.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for optimizing data flows in a hybrid cloud storage system. The method comprises dividing a data file into a plurality of data blocks; assigning a block code to each of the plurality of data blocks; generating, based on a contract with the CSS, a first list of block codes from the plurality of data blocks, wherein the contract defines at least data blocks guaranteed to exist in the CSS; querying the CSS with the first list of block codes; responsive of the query, receiving a second list of block codes from the CSS, wherein the second list of block codes includes block codes of data blocks designated in the first list of block codes but missing in the CSS; and transmitting to the CSS data blocks designated by their block codes in the second list.

The disclosed embodiments also include a method for optimized retrieving by a device, data files from cloud storage services (CSS). The method comprises: determining a set of data blocks required for reconstructing a byte range based on a file map; determining a first set of block blocks out of the set of data blocks being maintained in a distributed cache accessed by the device, wherein the first set of data blocks are determined based on their respective block codes; fetching the first set of data blocks from the distributed cache storage; retrieving a second set of data blocks from at least one cloud storage service, wherein the second set of data blocks are data blocks not being maintained in the distributed cache storage and are part of the byte range; and reconstructing the byte range from the first set of data blocks and second set of data blocks.

The disclosed embodiments also include a system for optimized data transfer in a cloud storage service (SCC). The system comprises: a processor; and a memory, the memory containing instructions that, when executed by the processor, configure the system to: divide a data file into a plurality of data blocks; assign a block code to each of the plurality of data blocks; generate, based on a contract with the CSS, a first list of block codes from the plurality of data blocks, wherein the contract defines at least data blocks guaranteed to exist in the CSS; query the CSS with the first list of block codes; responsive of the query, receive a second list of block codes from the CSS, wherein the second list of block codes includes block codes of data blocks designated in the first list of block codes but missing in the CSS; and transmit to the CSS data blocks designated by their block codes in the second list.

The disclosed embodiments also include a system for optimized receiving, by a device, data files from cloud storage services (CSS). The system comprises: a processor; and a memory, the memory containing instructions that, when executed by the processor, configure the system to: determine a set of data blocks required for reconstructing a byte range based on a file map; determine a first set of block blocks out of the set of data blocks being maintained in a distributed cache accessed by the device, wherein the first set of data blocks are determined based on their respective block codes; fetch the first set of data blocks from the distributed cache storage; retrieve a second set of data blocks from at least one cloud storage service, wherein the second set of data blocks are data blocks not being maintained in the distributed cache storage and are part of the byte range; and reconstruct the byte range from the first set of data blocks and second set of data blocks.

The disclosed embodiments also include a cloud connector. The cloud connector comprises: a cloud protocol module for communicating with a plurality of endpoints, wherein each of the plurality of endpoints is configured to synchronize data files with a cloud storage service; a storage module configured to store data containers in at least one of: a storage device and a cloud storage provider, wherein each data container includes aggregation of a plurality of data blocks; a container database configured to map each data block to a location of its respective data container, wherein the mapping is performed respective of a block code assigned to each data block; a buffer configured to buffer data blocks prior to storing data blocks in data containers; and a cloud cache module (CCM) configured to cache in a cache storage at least recently accessed data containers.

BRIEF DESCRIPTION OF THE DRAWINGS

The foregoing and other features and advantages of the disclosed embodiments will be apparent from the following detailed description taken in conjunction with the accompanying drawings.

DETAILED DESCRIPTION

Figure 1:
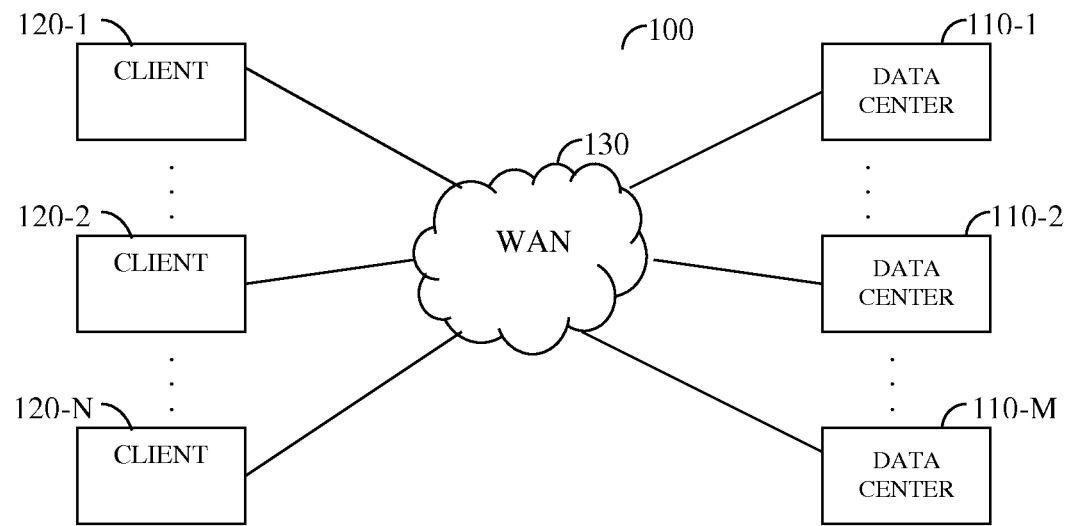
FIG. 1 is a diagram of a storage network system.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
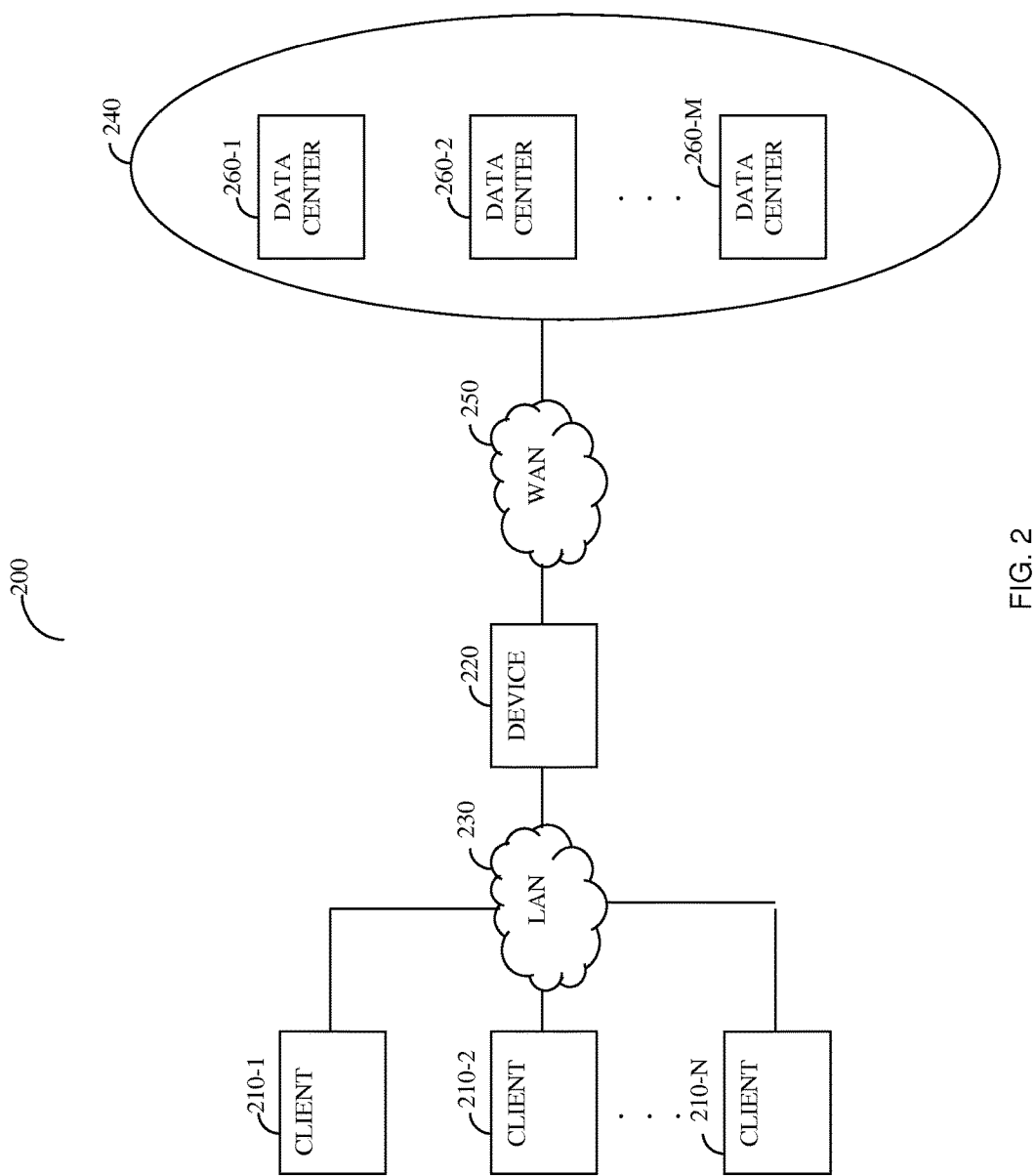
FIG. 2 is a storage network system used to describing the various disclosed embodiments.

FIG. 2 shows an exemplary and non-limiting diagram of a storage network system 200 utilized to describe the various disclosed embodiments. The storage network system 200 includes clients 210-1 through 210-N (hereinafter referred to individually as a client 210 or collectively as clients 210) connected to a device 220 through a local area network (LAN) 230, which may be either a wireless or wired network. The clients 210 can perform file-based operations on the device 220 by using any type of file sharing protocol including, but not limited to, a network file system (NFS), a common internet file system (CIFS), and the like. In addition, the device 220 is connected to data centers 260-1 through 260-M (hereinafter referred to individually as a data center 260 and collectively as data centers 260) via a network 250, which may be the Internet or a wide area network (WAN). The data centers 260 may be geographically distributed and implemented in a cloud storage service (CSS) 240 as discussed in detail herein below with respect to FIG. 3.

Figure 3:
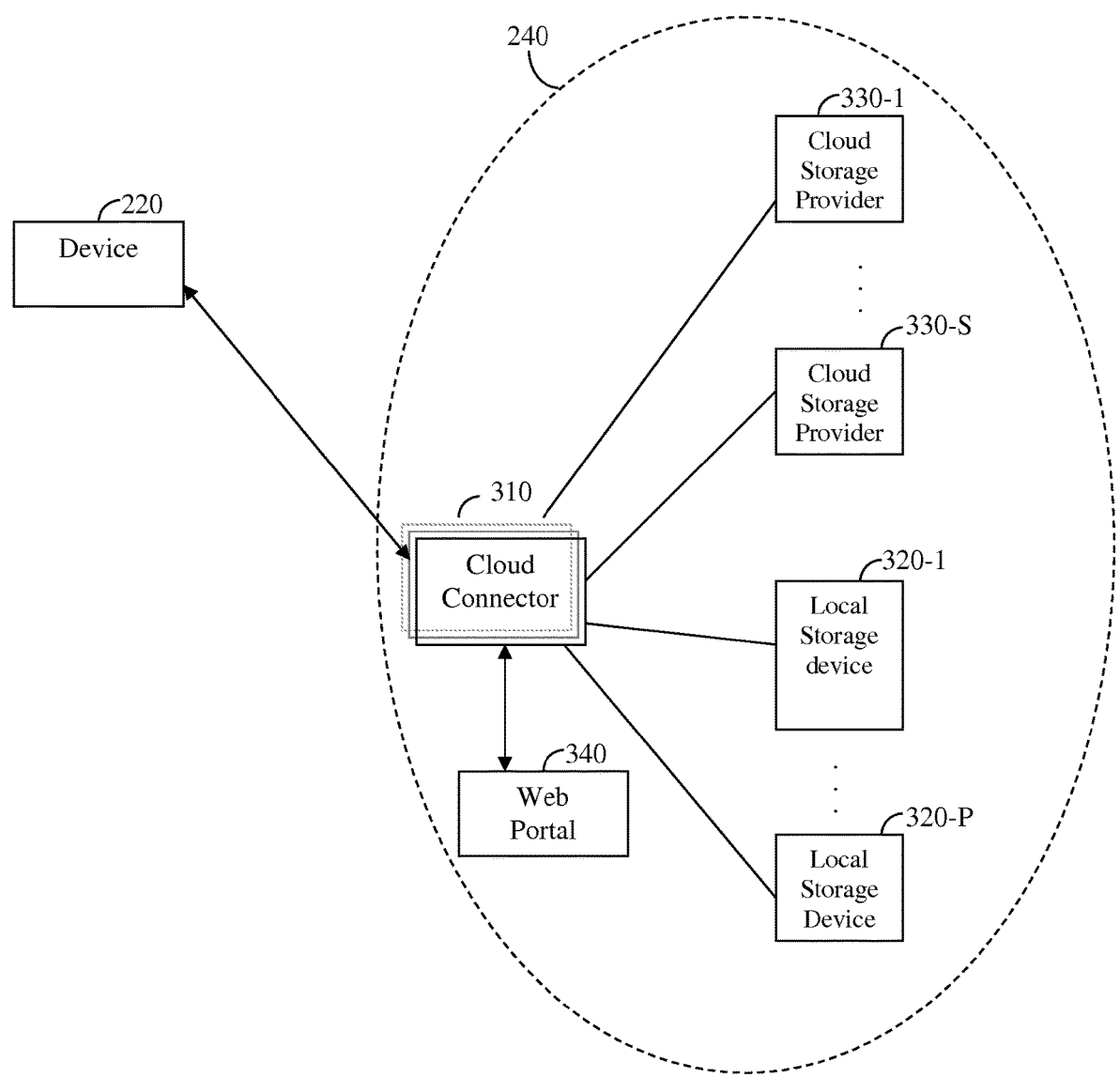
FIG. 3 is a cloud storage service (CSS) implemented according to an embodiment.

As illustrated in FIG. 3, the CSS 240 includes a plurality of cloud connectors 310 that facilitate connections between the device 220 and local storage devices 320-1 to 320-P. A local storage device 320 may be, but is not limited to, disk drives and/or SAN/NAS devices). The device 220 may further be communicatively connected, either directly or indirectly, to private object storage systems such as OpenStack or EMC Atmos, and/or to third party cloud storage providers 330-1 to 330-S. The third party cloud storage providers 330-1 to 330-S may be, but are not limited to, entities such as Amazon Web Services®, IBM SmartCloud®, and so on. The cloud connectors 310 operate in parallel to enable load balancing and to avoid a single point of failure. A web portal 340 is also provided to enable users to perform at least file-based operations on files stored in the CSS 240 using a web-based interface. The local storage devices 320-1 to 320-P are administratively organized in device groups (DGs), each device group containing one or more devices. When block encryption is used, device groups typically share the same block encryption key.

In order to allow transparent access from clients 210 to files stored in the CSS 240, the device 220 is configured to provide a shared network folder (hereinafter the "virtual cloud drive" (VCD)). The VCD exposes files that are stored at the CSS 240. When a client 210 tries to access a specific byte range from a VCD of the device 220 that is mapped to the CSS 240, the device 220 transparently contacts the CSS 240 and requests the blocks including the requested byte range on behalf of the client 210. The blocks are then reassembled, decrypted, and decompressed as needed to recover the original byte range. The reconstructed byte range is then returned to the client 210. To the client 210, the file appears to be stored locally on the device 220. The device 220 may cache recently and/or frequently accessed (i.e. read or write) data blocks in a memory (e.g., the memory 460) and/or in a storage device (e.g., the storage device 450). Such blocks can be returned directly from the cache instead of from the CSS 240.

Figure 4:
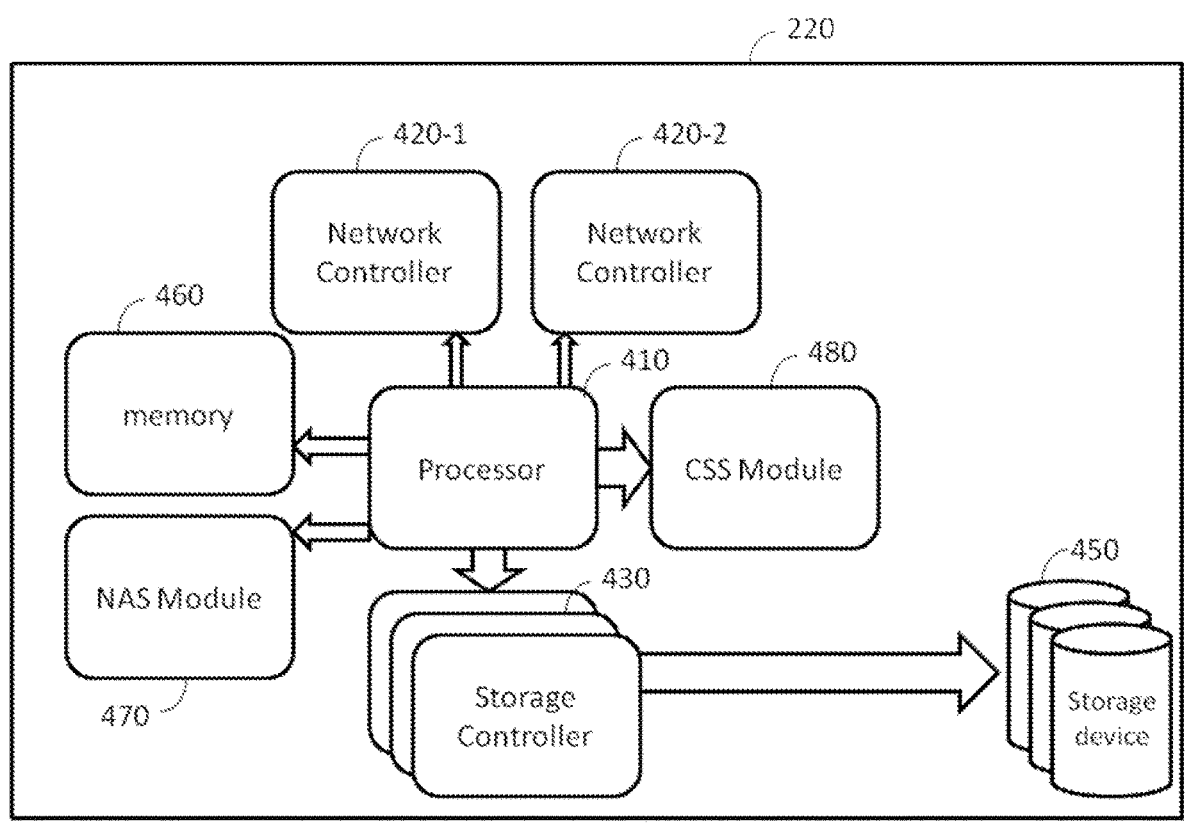
FIG. 4 is a block diagram of a device utilized by disclosed embodiment.

FIG. 4 shows an exemplary and non-limiting block diagram of the device 220 implemented according to one embodiment. The device 220 comprises a processor 410, network controllers 420-1 and 420-2 for interfacing with at least a LAN 230 and a network 250, a plurality of storage controllers 430 for controlling storage devices 450 attached to the device 220, and a non-volatile memory 460 for at least storing settings and configuration parameters required for the proper operation of the device 220. In the non-limiting embodiment shown in FIG. 4, the storage devices 450 are implemented within the device 220. In various other non-limiting embodiments, the storage devices 450 may be external to the device 220.

The memory 460 may be utilized to cache data transferred between the storage devices 450 and the CSS 240. In an embodiment, the cache storage may be realized by a persistent storage communicatively connected to the device 220 or integrated therein. In another embodiment, the cache storage may be a distributed cache including a plurality of caching servers or devices connected in different geographical locations. Access to the distributed cache can be performed using distributed caching techniques discussed in the related art. The embodiments discussed in detail below ensure data consistency and cache coherency regardless of the type of cache device/element or caching technique being implemented. The various cache devices discussed herein are commonly referred to as "cache storage," merely for simplicity purposes. In a non-limiting implementation, the data consistency and cache coherency are guaranteed as blocks stored and keyed by a content-dependent message digest code (MDC) function are never modified after being inserted, The memory 460 may also include software code executable by the processor 410. In certain embodiments, communication with the networks 230 and 250 may be achieved using a single network controller.

The device 220 further includes a NAS module 470 emulating the device 220 as a NAS device and a CSS module 480 allowing the integration of the device 220 with the CSS 240. The processor 410 is configured to run an operating system (not shown) adapted to provide file-based operations on the CSS and further to control the operation of the modules 470 and 480. The storage controllers 430 include, but are not limited to, a small computer system interface (SCSI), a serial advanced technology attachment (SATA), a universal serial bus (USB), a fibre channel (FC), a serial attached SCSI (SAS), and the like. In certain embodiments, the storage devices 450 may be external to the device 220.

One of the primary tasks of the CSS module 480 is to periodically or continuously synchronize data between the device 220 (i.e., data stored in the storage devices 450) and the CSS 240. The synchronization may be in the direction from the device 220 and the CSS 240 (hereinafter "the outgoing direction"), in the direction from the CSS 240 to the device 220 (hereinafter "the incoming direction"), or simultaneously in both directions. It should be noted that all files can be synchronized, or a partial subset of the files can be synchronized.

Synchronization in the outgoing direction is typically used as a data backup mechanism, allowing files to be backed up to the CSS 240 for safekeeping. The backup may be point-in-time backup allowing a user of the device 220 to save a snapshot of one or more folders maintained in the folder to a specific point in time. The user, in an embodiment, can configure the device 220 to initiate the snapshot process at pre-configured time intervals, at a particular time of day, and so on.

Synchronization in the incoming direction is typically used as a data distribution mechanism, allowing files to be distributed from the CSS 240 for a fast local access at the device 220 to provide fast and reliable local access to a set of files. Synchronization in both directions (bidirectional) is used to maintain data consistency between the device 220 and the CSS 240. This allows files to be modified or created both in the device 220 (through a filing sharing protocol) or in the CSS 240 (through the web portal 340). It should be noted that, when using bidirectional synchronization, one or more devices 220 can be optionally synchronized to a single location in the CSS 240. This enables multiple devices 220 to synchronize with each other through the CSS 240, which acts as a mediator.

In an embodiment, bidirectional synchronization is performed in real-time. That is, as the data block is written to or modified in the device 220 or the CSS 240, the data synchronization occurs in the opposite direction simultaneously or near-simultaneously.

In an embodiment, the user can configure both a unidirectional snapshot backup and bidirectional real-time synchronization on a set of one or more folders. For example, the user can configure the device 220 to take a snapshot of a folder named "patents" and back it up to a backup folder on CSS 240 every night at midnight. In parallel, any changes made to the folder in the device 220 are continuously synchronized bi-directionally with a second folder on CSS 240.

Any data block saved in the cloud is keyed using a hash function that computes a unique block hash. As a result, the same block is stored only once in the CSS 240 both during outgoing synchronization and during snapshot backups, where the access to the block is performed using the block hash. Therefore, it should be appreciated that disclosed techniques allow point-in-time (snapshot) backups and real-time synchronization with negligible space and bandwidth overhead, thereby improving system performance that would otherwise be hindered by excess bandwidth and memory consumption.

As noted above, the access (i.e., read and write operations) to the VCD may be accelerated by caching recently and/or frequently accessed blocks (i.e., blocks that are read and written regularly in relatively short time intervals) in the memory 460 or and/or the storage 450.

In one embodiment, the same cache storage is used during the data synchronization flows in both directions. That is, for example, when a user reads, from the VCD, a data block that has recently been synchronized to the device or restored from the CSS 240, reading the data block from the cache storage is more efficient because the block already saved in the cache.

In one embodiment, when files are synchronized to the device 220 in the incoming direction, the received blocks are stored by reference to the file where the block is stored and are not physically stored in the cache storage. In an exemplary embodiment, a unique identifier (e.g., an index node (inode) number or file path) of the stored file is kept in the cache storage along with the offset within the file and the block hash. Prior to saving the unique identifier to the cache storage, the block is read and the block hash is verified to ensure that the byte range has not been modified by a write operation performed after the unique identifier was created and saved to the cache storage. If the hash does not match, the cache entry is invalidated. This technique allows storing more blocks in the cache without increasing cache size, which results in significant improvements in the performance of the VCD, incoming and outgoing file synchronizations, and file restore operations.

In an embodiment, the device 220 stores previous versions of files as well as deleted files based on a retention policy, either at a logical volume manager or at a file system level. In this case, the cache storage including the unique identifiers can also take advantage of locally available versions of deleted files. If the file has been modified, the original block can still be fetched from the previous version's store. This technique further increases the cache utilization, because the snapshots (versioning) space doubles as additional cache space.

Figure 5:
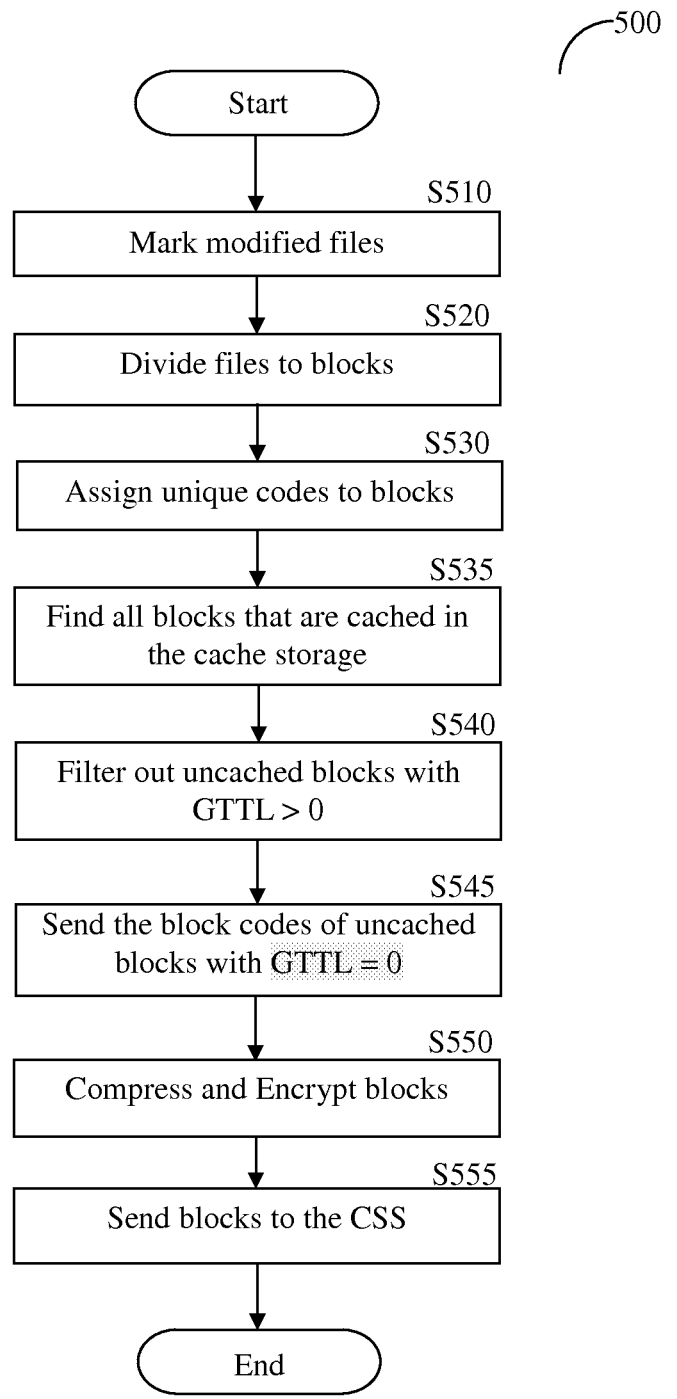
FIG. 5 is a flowchart illustrating a method for data synchronization according to one embodiment.

FIG. 5 is an exemplary and non-limiting flowchart 500 illustrating a method for data synchronization according to an embodiment. The method will be described with a reference to a specific embodiment where the synchronization is performed in the outgoing direction. However, one of ordinary skill in the art can easily adapt the steps of flowchart 500 for synchronization of data in the ingoing or bidirectional directions. It should be further noted that the synchronization of data flows can be performed in the incoming direction and in the outgoing direction concurrently, and that multiple synchronization flows can be performed concurrently from the same device. It should be noted that the steps of FIG. 5 are described with respect to the systems and devices of FIGS. 2-4 merely for simplicity purposes and with no limitations on the disclosed embodiments. Other systems for hybrid cloud storage may be used without departing from the scope of the disclosed embodiments.

In an embodiment, the CSS 240 stores previous versions of files as well as deleted files based on a retention policy. For example, the CSS 240 may store all versions of files as well as deleted files for a period of 30 days after modification and/or deletion.

This retention policy can be utilized in order to accelerate the data synchronization via a guaranteed time to live (GTTL) contract mechanism. Each data block saved in the CSS 240 is set with a GTTL parameter. This parameter depends on the snapshot from which the block was read or written, as well as the retention policy. For example, if the CSS retention policy is configured to retain all the stored file versions and retain deleted files for 30 days, then when the device 220 writes a block to the CSS 240, that block is guaranteed by contract with the CSS to be kept for at least 30 days after writing (i.e., the GTTL is set equal to 30 days). Likewise, when the block is read from the current snapshot, the GTTL is set equal to 30 days. However, when the block is read from a previous snapshot, a specific, lower GTTL can be calculated based on the snapshot age. In an exemplary embodiment, the GTTL is a non-negative integer number which represents the number seconds for which the block is guaranteed to be retained by the CSS. Furthermore in this embodiment, the device keeps a cache of block codes which were recently sent or received, with the associated contract with the CSS, for example in form of the GTTL of the block and the timestamp when this GTTL was calculated.

In S510, files stored either in the device 220 or in the CSS 240 that have been changed since the last synchronization are marked. In S520, each marked file is divided into blocks. The blocks' size may be variable. In S530, each block is assigned with a unique code. In an exemplary embodiment, the unique code is assigned using, for example, a message digest code (MDC) function. Thus, each block is addressed by its unique block code. In an embodiment, steps S510, S520, and S530 can be executed concurrently in a pipelined fashion (i.e., all steps performed simultaneously or near-simultaneously), rather than sequentially, to provide higher efficiency.

Thereafter, it is determined which of the data blocks have been modified. With this aim, according to one embodiment, in S535, a check is performed to find all data blocks that are saved in the cache storage. This ensures that the blocks in the cache storage have already been synchronized to the CSS 240. In S540, the GTTL and timestamp value of each block is checked to find and filter out all blocks where the combination of GTTL and timestamp indicates that the block is still guaranteed to be still possessed by the CSS. All blocks for which GTTL+timestamp is greater than the current time, are guaranteed to be still possessed by the CSS 240.

In S545, the list of remaining block codes that were not filtered out in S540, are sent to the CSS 240.

The CSS 240 is configured to check, for each received block code, whether a block with the same code exists on the CSS 240 in the device group of the client device. If a block with the same code already exists on the CSS 240 in the same device group, then the block does not need to be transmitted from the device 220 to the CSS 240. In an embodiment, the CSS 240 then replies with a compact run length encoded (RLE) list of the blocks which are missing on the CSS 240 and, therefore, should be transferred.

It should be appreciated that this approach of querying for only a subset of the blocks contained in the file (omitting the cached blocks where GTTL plus timestamp is in the future), and then sending another, potentially smaller subset of blocks which are contained in the file but are not present in the CSS, reduces the consumption of network bandwidth, and the utilization of computation resources in both the device 220 and the CSS 240.

The CSS 240 is configured to maintain a reference count for each block, which is increased by 1 for each file that uses this block. When a file is deleted from the CSS 240 (and the file retention period has expired based on the retention policy), the reference count of all the blocks associated with the deleted file is reduced by 1. When the reference count of a block reaches 0, this block is no longer used by any file and the storage space of this block may be freed. It should be appreciated that this approach results in significant storage space reduction, as multiple identical files or parts of files belonging to devices in each device group are stored only once in the CSS 240. This approach also reduces the consumption of network bandwidth, as only modified blocks are transmitted over the network 250. Furthermore, the CSS 240 can store a number of previous versions for each file, thereby allowing the user to restore a file to an earlier version. Since the file is stored as multiple blocks, the entire file does not need to be duplicated. Rather, only the differences between file versions are stored. This reduces the required storage space for file versioning.

Optionally, In S550, all modified blocks that should be sent over the network 250 from the device 220 to the CSS are encrypted and compressed using a lossless compression algorithm in order to reduce the bandwidth requirements. The encryption may be a block level encryption that uses, for example, a keyed hash cryptographic message digest code (HMAC) function to add an authentication code to each block. In many cases, the operator of the CSS is not considered a trusted party by the device owner. Thus, the encryption key can be known only to the owner of the device 220, thereby preventing even the operator of the CSS 240 from viewing or altering the contents of the stored files.

In S560, all modified blocks (optionally encrypted and compressed as described with respect to S550) are transmitted from the device 220 to the CSS 240 over the network 250. It should be noted that multiple blocks are transmitted without waiting for the CSS 240 to acknowledge the reception of a previously transmitted block, thereby enabling efficient utilization of high latency links.

The communication between the device 220 and CSS 240 is performed by means of a cloud transport protocol (CTP) implemented in accordance with an embodiment. The CTP is a secure, encrypted connection based on Transmission Control Protocol (TCP)/Internet protocol (IP), such as secure socket layer (SSL) or Transport Level Security (TLS). This encrypted connection ensures confidentiality against external eavesdroppers, and prevents malicious modification of the data in transit. The CTP also supports a message framing protocol for sending and receiving arbitrary length messages between the device 220 and CSS 240. The CTP further implements an authentication method by which the device 220 authenticates to the CSS 240, for example, by using a security certificate (asymmetric key), or by means of a symmetric secret key or password, thereby preventing an attacker from impersonating the CSS 240.

In addition to synchronizing files with the local storage available on the device 220, the CSS 240 can be utilized to expand the amount of local storage on the device 220. With this aim, the CSS 240 is exposed on the device 220 as an extended storage space in the device 220. This ability allows the device 220 to have capacities of mass storage systems (i.e., practically infinite storage space), specifically, allowing small NAS-like devices to have similar amounts of storage space as mass storage systems. To allow access to the extended storage space as if it is on the device itself, the VCD allows read/write operations on the expanded storage space on the CSS 240.

Figure 6:
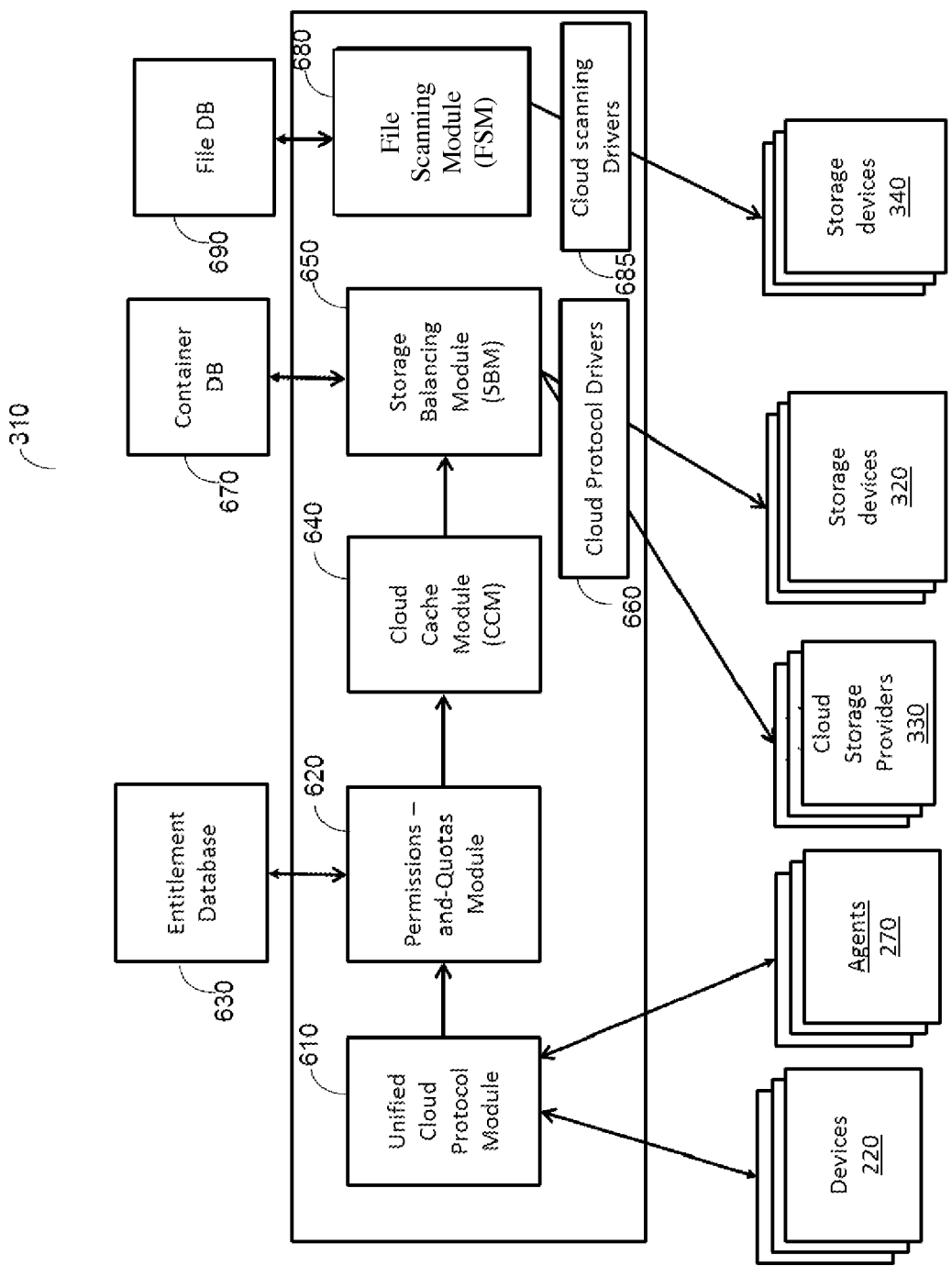
FIG. 6 is a block diagram of a cloud connector implemented according to an embodiment.

FIG. 6 shows an exemplary and non-limiting block diagram of a cloud connector (CC) 310 implemented in accordance with an embodiment. As described further herein above, one of the tasks of a cloud connector 310 is to interface between the device 220 and the storage devices 320, as well as to provide connections to cloud storage providers 330. In the current marketplace, there are a multitude of cloud storage providers. However, due to a lack of a universal standard for protocols of cloud storage providers, most providers use proprietary interfaces and protocols. To resolve this drawback, the cloud connector 310 provides the device 220 with a unified communication protocol to access one or more cloud storage providers 330. Specifically, the cloud connector 310 acts as a gateway and translates the unified protocol, used to communicate with the device 220, to the protocols implemented by different cloud storage providers 330.

It should be appreciated that this approach reduces the complexity of the device implementation, as the device 220 is not required to communicate directly with the various cloud storage providers 330. This approach further allows the addition of new cloud storage providers without modifying the device 220 or the clients 210 (clients 210 not shown in FIG. 6). In addition to providing a unified interface to cloud storage providers 330, the cloud connector 310 can provide the same interface for the storage devices 320.

The cloud connector 310 includes a unified cloud protocol module 610 for communicating with the device 220 by means of the cloud transport protocol described above. The cloud connector 310 also includes a permissions-and-quotas enforcement module 620, a service entitlement database 630, a cloud cache module (CCM) 640, a storage balancing module (SBM) 650, and one or more cloud protocol drivers 660 for interfacing with storage devices and cloud storage providers in the CSS 240.

The SBM 650 performs load balancing between multiple cloud storage providers 330 and possibly multiple local storage devices 340 based on criteria including, but not limited to, performance, cost, and reliability. For example, a simplistic balancing scheme could be to store 20 percent of the data to a storage device 320, and 80 percent of the data to a cloud storage provider 330. The split between the cloud storage providers 330 can be either static (for example, according to the block code) or dynamic (for example, based on the current cost and availability of each cloud storage provider).

The CCM 640 may cache recently used and/or frequently accessed data blocks locally, for reduction in communication costs to the cloud storage providers and reduced latency.

The permissions-and-quotas module 610 enforces and restricts access of devices 220 to data blocks according to a list of access control rules. The permissions-and-quotas module 610 can also enforce storage quotas for each device 220 and provide differentiated service levels per customer. The entitlement database 630 is used to store the service level agreement (SLA) for each of the customers, having accesses through clients 210 (not shown), subscribed to the third party cloud storage services 330. When a customer connects to the CSS 240, the entitlement database 630 is accessed to check whether the customer is entitled to the requested service. In addition, the entitlement database 630 contains additional service level information, such as storage and bandwidth quotas for each customer. It should be appreciated that the disclosed embodiments effectuate a storage solution that combines the speed and practicality of NAS devices on the local network, with the scalability and disaster protection of cloud storage services.

In one embodiment, the cloud connector 310 is configured to perform data block aggregation to improve performance of the read and write operations to the CSS 240 (not shown). Specifically, a block buffer is configured to buffer data blocks prior to storing such blocks in the SBM 650. In exemplary implementation, the buffer is included in the CCM 640.

In an embodiment, an analysis is performed on the data blocks to determine if they are related to each other. Only data blocks that are related to each other, and therefore likely to be fetched together, are aggregated. The analysis determines if the blocks are from the same source, belong to the same files, and/or were received together. It should be appreciated that this approach helps to reduce storage costs and increase efficiency by aggregating multiple small write operations into a few larger operations.

Aggregations of two or more data blocks are saved into at least one data container (not shown) before being passed to the SBM 650. The SBM 650 is configured to write the data containers to a cloud storage provider 330 or to a storage device 320 through a respective cloud protocol driver 660. It should be noted that one cloud protocol driver is shown in FIG. 6 merely for simplicity purposes and without limitation on the disclosed embodiments. Multiple cloud protocol drivers, each of which may be associated with one or more storage devices 320 and/or cloud storage providers 330, without departing from the scope of the disclosed embodiments. Each container is assigned a unique object ID (01D).

According to this embodiment, a container database (DB) 670 is also included in or communicatively connected to the cloud connector 310. The SBM 650 is configured to add records from the container DB 670, wherein each such record maps each block code to its respective container's OID. For each container record, the container size and the amount of deleted data in the container is saved. The amount of deleted data is initialized to 0. When a reference count of a specific block reaches a 0 value, the amount of deleted data in the container is increased according to the deleted block size. Containers containing deleted data may be either shrunk to free the unused space, or merged with other containers having deleted data, based on a predefined policy. In an embodiment, the storage space recovery process gives preference to merging containers with unused space having similar or related content.

In an embodiment, upon receipt of a reading request, the container DB 670 is searched for the container that keeps the requested blocks and the entire container is fetched into the CCM 640. It should be appreciated that, since the related blocks are often read together, the disclosed technique increases read performance by performing fewer read operations and by acting as a "cache pre-fetch," thereby priming the CCM 640 with blocks which are likely to be requested, before they are actually requested.

In an embodiment, the cloud connector 310 includes a file scanning module (FSM) 680 connected to a plurality of cloud scanning drivers 685 which communicate with the storage devices 340. A file database (DB) 690 is also included in or communicatively connected to the cloud connector 310. The file DB 690 is configured to contain a list of files and file versions in the system, and the list of blocks IDs needed to reconstruct each file ("file map"). The file maps may be stored in cloud storage or storage device, or may be stored directly in the FDB 690. In large scale systems, there may be multiple file DBs (hereinafter, "shards"), each of which is responsible for a specific subset of the file namespace.

The scanning engines are configured to perform a plurality of scanning tasks including, but not limited to, antivirus scans, scanning for corrupt files, scanning specific file formats, and so on. The FSM 680 stores, for each file, the scanning results of each engine. These results may be stored in the FDB 690, or may be kept in files stored in the cloud storage.

In an embodiment, a background process in the FSM 680 queries the file DB 690 to detect files for which some of the required scans were not yet run, based on policy. If such files were found, the FSM 680 is configured to run scanning processes in the background. The FSM 680 is configured to use content scanning drivers to interface with a variety of internal or external content scanning engines. The content scanning drivers may be built into the system or dynamically loaded.

In a preferable embodiment, multiple file scans are executed in parallel using a thread pool. In some embodiments, an automatically incrementing database sequence is used to assign a monotonically increasing serial number to each uploaded file (or updated file version). This sequence number is used as the primary key in the files table of the file DB 690, and is indexed using an order-preserving indexing scheme such as b-tree. By means of this index, it is possible to efficiently enumerate files on each file DB 690 in their order of arrival. A "high watermark" (HWM) value is stored for each scanning engine, containing the highest sequence number that has been scanned to date (or evaluated by the policy engine to determine that scanning is not required). The HWM is periodically stored to persistent storage, but not necessarily after every scanning operation.

In an exemplary embodiment, the HWM is persisted after every scanning batch is completed. When the system starts, the last stored HWM is read from persistent storage. The database is queried for files with sequence numbers greater than the HWM. The database returns a batch of files with sequence numbers greater than the HWM. Files in the batch that were already marked as scanned, are ignored. The remaining files are evaluated by the policy engine to determine if they need to be scanned and, if so, they are scanned using the appropriate cloud scanning driver. It should be appreciated that this method allows for efficient enumeration on the changed files, while minimizing lost work in case the system has been shut down improperly or suddenly.

In addition to communicating with cloud integrated storage devices 220, the cloud connector 310 can, in some embodiments, also communicate with a plurality of agents 270 through the unified cloud protocol module. An agent 270 may be a hardware component, a software component, or a combination thereof, which is connected to or associated with a specific workstation, server, or other computing device. For example, a workstation agent may be software installed on a personal computer, such as to integrate this workstation with the CSS 240 and/or the cloud integrated storage devices 220. As another example, a mobile device agent may be an application installed on a mobile device, such as a smartphone, acting to integrate the mobile device with the CSS 240 and/or the cloud integrated storage devices 220. It should be appreciated that all the techniques and protocols disclosed above for cloud integrated storage devices, are also applicable to agents, and that Agents can provide the same data synchronization services for data flows in the incoming direction, outgoing direction, or both. Agents and cloud integrated storage devices are collectively referred to as cloud endpoints or "Endpoints".

Some Endpoints may reside in close proximity to each other, based on geographical locations, network topology access delay, bandwidth criteria, cost criteria, administrative configuration, and so on. A region is defined as a set of Endpoints that are close to each other based on the above described criteria. The members of the region may be static, or may be dynamic in case there are mobile Endpoints which roam between regions.

In some embodiments, Endpoints of each region team up to form a regional cluster. Such a regional cluster can provide a shared, large capacity block cache (layer2-cache) service which is used in addition to the own local cache (layer1-cache) of the Endpoints, thereby increasing the probability that block reads can be satisfied locally from the regional cache and without requiring access to the CSS 240. This is advantageous since the CSS 240 is often located at a distant datacenter and, therefore, such a technique may reduce latency, reduce load on the WAN link as well as on the Cloud Connectors, and increase the overall responsiveness and throughput of the cloud storage service.

One of the keys to better cache performance is an efficient cache replacement policy which attempts to keep popular items in the cache and to replace rarely used items. A cache replacement policy is defined by a function that returns a score for each item in the cache. Items are sorted based on their respective scores, and items with the lowest score are evicted from the cache in order to make place for higher score items.

Cache replacement policies disclosed in the related art, such as LRU (least recently used) and MRU (most recently used), can be employed by the cache. However, in an embodiment, the score is also a function of the cost of re-obtaining the cached item. For example, items which exist in the layer-2 cache may be given a higher score than items which are more expensive to obtain. In another exemplary embodiment, the score may take into account the estimated latency (in milliseconds) required to re-obtain the item, which is calculated based on statistics of the throughput and round-trip-time of a next-level cache which contains the item.

In an embodiment, the blocks are stored in the cache addressed by their block code and, therefore, the blocks in the cache never change after being inserted. This ensures data and cache consistency, enabling the use of simple distributed caching techniques which do not themselves provide strong consistency or cache coherency. Furthermore, the blocks are stored in an encrypted fashion and are signed using a keyed hash function, thereby relieving the inherent security concerns of such distributed caching schemes.

In some embodiments, the regional cache can be implemented as a distributed cache stored on a set of cooperating Endpoints acting as a cluster.

In other embodiments, the regional cache can be stored on the cloud integrated storage devices acting as gateways for nearby agents ("Gateways"). Agents which have one or more Gateways in their region utilize the block-caching service provided by the Gateways in order to accelerate access to cloud storage.

As a generalization, in some embodiments, regions can be nested, and the described layer-2 cache can therefore be extended with additional caching layers to form layer-3 caches, layer-4 caches, and so on.

In some embodiments, the Endpoints may use a protocol supporting multicasting or broadcasting in order to lookup blocks in the regional cache, as well as to detect other Endpoints in the region. This technique may increase efficiency as compared to a Unicast-based protocol.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for an optimized transfer of data files to a cloud storage service (CSS), comprising:
   dividing a data file into a plurality of data blocks;
   assigning a block code to each of the plurality of data blocks, wherein each of the assigned block codes is a hash of the content of the data block so that each block code is sufficient by itself to address a block to which it is assigned;
   generating, based on a contract with the CSS, a first list of block codes from the plurality of data blocks, wherein the contract defines at least particular data blocks guaranteed to exist in the CSS, wherein the contract further defines a guarantee to retain every data block of the particular data blocks for a predefined time period and wherein the contract is implemented by setting a guaranteed time to live for each of the particular data blocks guaranteed to exist in the CSS to the predefined time period;
   querying the CSS with the first list of block codes, wherein each block code is employed in the first list as the sole identifier of each block;
   responsive to the query, receiving a second list of block codes from the CSS, wherein the second list of block codes includes block codes of data blocks designated in the first list of block codes but missing in the CSS; and
   transmitting to the CSS data blocks designated by their block codes in the second list.

2. The method of claim 1, wherein the predefined time period is determined based on a retention policy of the data file.

3. The method of claim 1, wherein the contract is defined for each of the plurality of data blocks stored in a cache accessible by a client.

4. The method of claim 3, wherein the optimized file transfer is any one of: from the client to the CSS, from the CSS to the client, and bidirectional between the client and the CSS.

5. The method of claim 1, wherein the second list of block codes is sent as a compact run length encoded (RLE) list.

6. The method of claim 1, wherein the number of the block codes in the second list is no larger than the number of block codes in the first list.

7. A non-transitory computer readable medium having stored thereon instructions for causing one or more processing units to execute the method according to claim 1.

8. A system for optimized data transfer in a cloud storage service (CSS), comprising:
   a processor; and
   a memory, the memory containing instructions that, when executed by the processor, configure the system to:
   divide a data file into a plurality of data blocks;
   assign a block code to each of the plurality of data blocks, wherein each of the assigned block codes is a hash of the content of the data block so that each block code is sufficient by itself to address a block to which it is assigned;
   generate, based on a contract with the CSS, a first list of block codes from the plurality of data blocks, wherein the contract defines at least particular data blocks guaranteed to exist in the CSS, wherein the contract further defines a guarantee to retain every data block of the particular data blocks for a predefined time period and wherein the contract is implemented by setting a guaranteed time to live for each of the particular data blocks guaranteed to exist in the CSS to the predefined time period;
query the CSS with the first list of block codes, wherein each block code is employed in the first list as the sole identifier of each block;
responsive to the query, receive a second list of block codes from the CSS, wherein the second list of block codes includes block codes of data blocks designated in the first list of block codes but missing in the CSS; and
transmit to the CSS data blocks designated by their block codes in the second list.

9. The method of claim 1, wherein the particular data blocks are blocks of the data file.

10. The method of claim 1, wherein the hash of the content of the data block is derived by applying a message digest code (MDC) function to the content of the block.

11. The system of claim 8, wherein the particular data blocks are blocks of the data file.

12. The system of claim 8, wherein the hash of the content of the data block is derived by applying a message digest code (MDC) function to the content of the block.

13. The method of claim 1, wherein the optimized transfer of data files to a CSS is from a device providing a shared network folder to a client, wherein the method is performed by the device providing a shared network folder, and wherein the data file that is divided into a plurality of data blocks is a data file of the client.

14. The method of claim 13, wherein, each data file is stored in the CSS as a list of a set of blocks that make up the file stored in a subset of the CSS such that each block only exists once in the subset of the CSS, each block having a unique code assigned thereto in the subset of the CSS, at least one of the files comprising a plurality of the blocks and wherein each block of each file in the device providing a shared network folder is assigned its block code such that a block that contains the same data as a block stored in the subset of the CSS is assigned the same code as is assigned to that same data block in the CSS.

15. The system of claim 8, wherein the optimized transfer of data files to a CSS is from a device providing a shared network folder to a client, wherein the method is performed by the device providing a shared network folder, and wherein the data file that is divided into a plurality of data blocks is a data file of the client.

16. The system of claim 15, wherein, each data file is stored in the CSS as a list of a set of blocks that make up the file stored in a subset of the CSS such that each block only exists once in the subset of the CSS, each block having a unique code assigned thereto in the subset of the CSS, at least one of the files comprising a plurality of the blocks and wherein each block of each file in the device providing a shared network folder is assigned its block code such that a block that contains the same data as a block stored in the subset of the CSS is assigned the same code as is assigned to that same data block in the CSS.

* * * * *